United States Patent
Futagawa (10) Patent No.: US 10,017,693 B2
(45) Date of Patent: Jul. 10, 2018

(54) METHOD FOR SUPPRESSING CORROSION OF GLASS

(71) Applicant: Asahi Glass Company, Limited, Chiyoda-ku (JP)

(72) Inventor: Norifumi Futagawa, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 62 days.

(21) Appl. No.: 15/200,272

(22) Filed: Jul. 1, 2016

(65) Prior Publication Data

US 2016/0312119 A1    Oct. 27, 2016

Related U.S. Application Data (63) Continuation of application No. PCT/JP2015/051909, filed on Jan. 23, 2015.

(30) Foreign Application Priority Data

Jan. 27, 2014  (JP) ................................. 2014-012759

(51) Int. Cl.
*C09K 15/02*    (2006.01)
*C03C 23/00*    (2006.01)
(Continued)

(52) U.S. Cl.
CPC ............... *C09K 15/02* (2013.01); *B01D 15/02* (2013.01); *C03C 15/00* (2013.01); *C03C 23/00* (2013.01)

(58) Field of Classification Search
None
See application file for complete search history.

(56) References Cited

U.S. PATENT DOCUMENTS 4,023,106 A * 5/1977 Utsunomiya ........... H03J 3/185
                                                         334/15
4,927,962 A * 5/1990 Aramaki ................. C07C 51/04
                                                        562/113

(Continued)

FOREIGN PATENT DOCUMENTS

JP          50-76029         6/1975
JP          58-201732       11/1983
(Continued)

OTHER PUBLICATIONS

International Search Report dated Apr. 21, 2015 in PCT/JP2015/051909 filed on Jan. 23, 2015.

*Primary Examiner* — Joseph D Anthony
(74) *Attorney, Agent, or Firm* — Oblon, McClelland, Maier & Neustadt, L.L.P.

(57) ABSTRACT

To provide a method for suppressing corrosion of glass to be in contact with a liquid material containing fluoride ions or a condensate of gas vaporized therefrom, without adding an alkaline substance, and further without imposing restrictions on e.g. the temperature, the pH, the fluoride ion concentration and the water content.

A method for suppressing corrosion of glass to be in contact with either one or both of a liquid material containing fluoride ions and a condensate of gas vaporized from the liquid material,
 wherein the liquid material contains a powder containing silicon dioxide, and the silicon dioxide is contained in a molar ratio of one or more times to the fluoride ions.

14 Claims, 2 Drawing Sheets

(51) Int. Cl.
*B01D 15/02* (2006.01)
*C03C 15/00* (2006.01)

(56) References Cited

U.S. PATENT DOCUMENTS

| | | | | |
|---|---|---|---|---|
| 5,006,563 A | * | 4/1991 | Hamer | C07C 45/004 |
| | | | | 514/646 |
| 6,252,105 B1 | * | 6/2001 | Braun | C07C 51/47 |
| | | | | 560/227 |
| 2009/0227821 A1 | * | 9/2009 | Alty | B01J 21/063 |
| | | | | 570/175 |

FOREIGN PATENT DOCUMENTS

| | | |
|---|---|---|
| JP | 64-85946 | 3/1989 |
| JP | 10-329282 | 12/1998 |
| JP | 2001-233797 | 8/2001 |
| JP | 2002-526385 | 8/2002 |

* cited by examiner

METHOD FOR SUPPRESSING CORROSION OF GLASS

TECHNICAL FIELD

The present invention relates to a method for suppressing corrosion of glass to be in contact with either one or both of a liquid material containing fluoride ions ($F^-$) and a condensate of gas vaporized from the liquid material.

BACKGROUND ART

A liquid material (such as a dispersion containing a fluororesin, a dispersion containing a fluororubber, a solution containing a fluorosurfactant or a waste liquid discharged in a production step) to be treated for production of a fluorinated compound (such as a fluororesin, a fluororubber or a fluorosurfactant), contains a slight amount of fluoride ions.

In an equipment or an apparatus for treating a liquid material containing fluoride ions, a metal is corroded by the fluoride ions, at a portion to be in contact with either one or both of the liquid material containing the fluoride ions and a condensate of gas vaporized from the liquid material. Further, a liquid material to be treated for producing some types of fluorinated compounds may be treated under acidic conditions with hydrochloric acid. Therefore, in a case where a liquid material containing fluoride ions is treated particularly under acidic conditions with hydrochloric acid, it is necessary to carry out lining (such as glass lining or resin lining) to the surface of a metal at a portion to be in contact with the liquid material or the condensate, or to employ carbon fiber reinforced plastics (hereinafter, referred to as "CFRP") instead of a metal.

In the case of the resin lining, if the liquid material containing fluoride ions further contains an organic solvent, the organic solvent may penetrate between resins or between a resin and a metal, whereby peeling (hereinafter, referred to as "blister") may occur to the resin. Particularly in e.g. a polymerization tank or a heat exchanger, if a heat medium having a large temperature difference with the liquid material containing fluoride ions is made to flow into a jacket side of the polymerization tank or a shell side of the heat exchanger, blistering tends to occur. Therefore, in a case where a liquid material containing an organic solvent is treated in an equipment or an apparatus lined with the resin, operation conditions are significantly restricted.

In the case of employing CFRP, an equipment or an apparatus employing the same may increase in cost. Further, depending upon the type of the liquid containing fluoride ions, phenol derived from an epoxy resin used for CFRP may be eluted into the liquid material. If a fluorinated compound contained in the liquid material and phenol eluted into the liquid material have a small difference in boiling point, it is difficult to separate the phenol by distillation.

The glass lining, which is corroded by fluoride ions, is not suitable for an equipment or an apparatus for treating a liquid material containing fluoride ions. Nevertheless, the resin lining and CFRP have the above-mentioned problems, and therefore there is no way but to employ the glass lining even when a liquid material containing fluoride ions is used.

As a method for suppressing corrosion of glass lining, the following methods are well known.

(1) A method of lowering a temperature of a liquid material containing fluoride ions and a temperature of an equipment or an apparatus, as far as possible.

(2) A method of preventing inclusion of moisture into a liquid material containing fluoride ions.

(3) A method of suppressing a concentration of fluoride ions in a liquid material, to be 2 mass ppm or less.

(4) A method of controlling a pH of a liquid material containing fluoride ions, to be within a range of more than 4 and less than 7.

(5) A method of reducing a solid content in a liquid material so as to avoid handling of slurry fluid.

However, operation conditions are still significantly restricted in the case of any of the methods (1) to (5).

As other methods for suppressing corrosion of glass lining, the following methods may be considered.

(6) A method of adding an alkaline substance (such as $CaCl_2$ or NaOH) to a liquid material containing fluoride ions so as to precipitate the fluoride ions as a salt (such as $CaF_2$ or NaF), separating the salt from the liquid material, and then treating the liquid material in an equipment or an apparatus.

However, according to the above method (6), an aimed fluorinated compound contained in the liquid material may not only decrease in yield, but also be hardly recovered, if the aimed fluorinated compound contained in the liquid material is reacted with an alkaline substance or if the liquid material is treated under acidic conditions.

As other methods for suppressing corrosion of glass lining, the following method may be proposed.

(7) A method of controlling the upper limit of a fluoride ion concentration, in accordance with a pH of the liquid material containing fluoride ion and a temperature of the liquid material or a heating medium (Patent Document 1).

However, operation conditions are significantly restricted in the case of the method (7). In particular, if a pH is 1 or less and a temperature is 20° C., this method cannot be applied unless the fluoride ion concentration is 7 mass ppm or less. Further, if a pH is 3 and a temperature is 20° C., this method cannot be applied unless the fluoride ion concentration is less than 290 mass ppm. Further, this method fails to define conditions of a fluoride ion concentration in a case where a pH is less than 1.

PRIOR ART DOCUMENT

Patent Document

Patent Document 1: JP-A-2001-233797

DISCLOSURE OF INVENTION

Technical Problem

It is an object of the present invention to provide a method for suppressing corrosion of glass to be in contact with a liquid material containing fluoride ions or a condensate of gas vaporized from the liquid material, even when the liquid material containing fluoride ions is treated, without adding an alkaline substance, and further without imposing restrictions on e.g. a temperature, a pH, a fluoride ion concentration, a water content and a content of a solid component.

Solution to Problem

The method for suppressing corrosion of glass of the present invention is a method for suppressing corrosion of glass to be in contact with either one or both of a liquid material containing fluoride ions and a condensate of gas vaporized from the liquid material, wherein the liquid material contains a powder containing silicon dioxide, and the silicon dioxide is contained in a molar ratio of one or more times to the fluoride ions.

The above glass is preferably provided on a portion, in an equipment or an apparatus for treating the liquid material, to be in contact with either one or both of the liquid material and the condensate.

The above silicon dioxide is preferably contained in an amount of at least 60 mass % based on 100 mass % of the powder.

The powder preferably has an average particle size of at most 0.5 mm.

The fluoride ions preferably have a concentration of at least 0.1 mass ppm.

It is preferred that the liquid material contains an aqueous medium as its medium, and has a pH of 13 or less, and it is more preferred that the liquid material contains hydrochloric acid, and has a pH of less than 7.

The present invention is suitable when the liquid material contains a fluorosurfactant, and the present invention is particularly suitable when the fluorosurfactant is either one or both of ammonium perfluorooctanoate and ammonium perfluoro-3,6-dioxa-octanoate.

The powder containing silicon dioxide is preferably a silica gel.

The silicon dioxide is preferably contained in a molar ratio of at most 120 times to the fluoride ions.

Advantageous Effects of Invention

According to the method for suppressing corrosion of glass of the present invention, it is possible to suppress corrosion of glass to be in contact with a liquid material containing fluoride ions or a condensate of gas vaporized from the liquid material, even when the liquid material containing fluoride ions is treated, without adding an alkaline substance, and further without imposing restrictions on e.g. a temperature, a pH, a fluoride ion concentration, a water content and a content of a solid component.

DESCRIPTION OF EMBODIMENTS

The following definitions of terms are applied throughout this specification and a scope of claims.

"A liquid material" means one containing compounds (such as a medium (such as water or an organic solvent) and a fluorinated compound (such as a fluorosurfactant)) which are liquids at a temperature for treating the liquid material, and means one (such as a composition or a mixture) which can be treated as a liquid fluid or a slurry fluid at a temperature for treating the liquid material.

"A condensate" means one which is formed into a liquid by condensation of gas vaporized from a liquid material. Gas vaporized from the liquid material containing fluoride ions usually contains hydrogen fluoride, and therefore fluoride ions are contained in a condensate of the gas vaporized from the liquid material containing fluoride ions.

"An equipment or an apparatus for treating a liquid material" means e.g. an apparatus, a pipe or a component for treating a liquid material, or a building material equipped with them.

"A pH of a liquid material" is a value measured by using a commercially available pH meter.

"A fluoride ion concentration in a liquid material" is a value measured by a commercially available fluoride ion meter.

"An average particle size of a powder" is a value measured by a sieving method with respect to a powder having a particle size of at least 10 μm, and is a value measured by a commercially available Coulter counter with respect to a powder having a particle size of less than 10 μm.

<Method for Suppressing Corrosion of Glass>

The method for suppressing corrosion of glass of the present invention is a method for suppressing corrosion of glass to be in contact with either one or both of a liquid material containing fluoride ions and a condensate of gas vaporized from the liquid material.

(Glass)

The type of glass is not particularly limited so long as it is a known glass (such as glass to be used for e.g. glass lining, a glass apparatus, an experimental tool, a glass fiber, or glass to be used for electrical/optical applications), and this method is applicable to any of quartz glass, silicate glass, borate glass and phosphate glass. Among them, the method is effective when applied to silicate glass, borate glass or phosphate glass.

The glass is preferably provided on a portion, in an equipment or an apparatus for treating a liquid material containing fluoride ions, to be in contact with either one or both of the liquid material and the condensate, since the effect of the present invention is sufficiently achieved.

The equipment or apparatus for treating a liquid material may, for example, be a glass reactor, a glass stirring vessel, a glass vessel, a glass pipe, a glass stirring vane, a glass heat exchanger, a glass distillation column, a glass packed material, a glass-lined reactor, a glass-lined stirring vessel, a glass-lined vessel, a glass-lined pipe, a glass-lined stirring vane, a glass-lined heat exchanger, a glass-lined distillation column, a glass-lined, a glass-lined baffle or a glass-lined valve.

(Liquid Material)

The liquid material containing fluoride ions may, for example, be a liquid material to be treated for production of a fluorinated compound or a condensate of gas vaporized form the liquid material.

The liquid material to be treated for production of a fluorinated compound may, for example, be a dispersion or a solution containing an aimed fluorinated compound (hereinafter also referred to as an aimed product) or a starting material thereof, or a waste liquid discharged in a production step. The liquid material to be treated for production of a fluorinated compound contains an aimed product (such as a fluororesin, a fluororubber, a fluorosurfactant, a fluorosolvent, hydrogen fluoride or a fluoride salt), a starting material thereof, a medium, an additive or a decomposed product thereof.

When the aimed product is a fluororesin, the starting material may, for example, be a fluoromonomer or a nonfluoromonomer, and the medium may, for example, be water, a fluoroorganic solvent or a non-fluoroorganic solvent. Further, the additive may, for example, be a fluorosurfactant, a non-fluorosurfactant, a fluoropolymerization initiator or a non-fluoropolymerization initiator, and the decomposed product may, for example, be hydrogen fluoride or fluoride ions.

The liquid material to be treated for production of a fluorinated compound, contains fluoride ions (which may be hydrogen fluoride or a fluoride salt) derived from the aimed product itself or fluoride ions derived from a decomposed product of the aimed product, a fluorinated starting material, a fluorinated medium or a fluorinated additive.

The fluoride ion concentration in the liquid material containing fluoride ions is preferably at least 0.1 mass ppm, more preferably at least 2 mass ppm, further preferably at least 100 mass ppm. If the fluoride ion concentration is less than 0.1 mass ppm, corrosion of glass hardly proceeds. The fluoride ion concentration in the liquid material containing fluoride ions is preferably at most 1,000 mass ppm from the viewpoint that silicon dioxide is uniformly dispersed in a system.

The medium (a dispersion medium or a solvent) in the liquid material may be an aqueous medium or a non-aqueous medium. From the viewpoint that a powder containing silicon dioxide can uniformly be dispersed, an aqueous medium is preferred.

The aqueous medium is a medium containing water in an amount exceeding 50 mass %, which may also contain an organic solvent. The organic solvent may be a water-soluble organic solvent or a water-insoluble organic solvent.

The non-aqueous medium is a medium containing an organic solvent in an amount of at least 50 mass %, which may also contain water. The content of water is preferably at most 50 mass %, more preferably at most 30 mass %, further preferably at most 10 mass %, per 100 mass % of the non-aqueous medium. As the content of water becomes lower, the corrosion of glass is less likely to proceed.

When the medium is an aqueous medium, a pH of the liquid material is preferably at most 13, more preferably at most 10, further preferably less than 7, particularly preferably at most 6. When the medium is an aqueous medium, a pH of the liquid material is preferably at least 0, more preferably at least 3, particularly preferably at least 4. In a case where the medium is an aqueous medium, the corrosion of glass is sufficiently suppressed, and mechanical performance of the glass is less deteriorated, as far as a pH of the liquid is within the above range.

A liquid material in which the medium is an aqueous medium, is preferably a liquid material containing an acid and further having a pH of less than 7. When the liquid material contains an acid and further has a pH of less than 7, the effect of suppressing corrosion by silicon dioxide is sufficiently achieved. The acid may, for example, be hydrochloric acid, sulfuric acid, nitric acid, phosphoric acid or boric acid, and hydrochloric acid is particularly preferred since it is relatively difficult to apply such an acid to a metal equipment.

The liquid material may contain either one or both of a hydrocarbon compound and a fluorinated compound (such as fluorosurfactant). A liquid material containing no fluorinated compound but containing a hydrocarbon compound may hardly corrode glass as compared with a liquid material containing a fluorinated compound. This suggests that the fluorinated compound can be a source for generating fluoride ions depending upon conditions.

Among the fluorinated compounds, a fluorosurfactant easily becomes a source for generating fluoride ions. Accordingly, the present invention is suitable when the liquid material contains a fluorosurfactant.

The fluorosurfactant may, for example, be a perfluoroalkanoic acid having an ether bond, perfluorohexanoic acid, perfluoroheptanoic acid, perfluorooctanoic acid, perfluorononanoic acid or a salt thereof (such as an ammonium salt).

The perfluoroalkanoic acid having an ether bond may be the following compounds.

$CF_3OCF_2CF_2OCF_2COOH$,
$C_2F_5OCF_2CF_2OCF_2COOH$,
$C_3F_7OCF_2CF_2OCF_2COOH$,
$C_4F_9OCF_2CF_2OCF_2COOH$,
$C_5F_{11}OCF_2CF_2OCF_2COOH$,
$C_6F_{13}OCF_2CF_2OCF_2COOH$,
$CF_3O(CF_2CF_2O)_2CF_2COOH$,
$C_2F_5O(CF_2CF_2O)_2CF_2COOH$,
$C_3F_7O(CF_2CF_2O)_2CF_2COOH$,
$C_4F_9O(CF_2CF_2O)_2CF_2COOH$,
$CF_3O(CF_2CF_2O)_3CF_2COOH$,
$C_2F_5O(CF_2CF_2O)_3CF_2COOH$, etc.

Among the fluorosurfactants, ammonium perfluorooctanoate and ammonium perfluoro-3,6-dioxa-octanoate tend to be a source for generating fluoride ions. Accordingly, the present invention is particularly suitable when the liquid material contains either one or both of ammonium perfluorooctanoate and ammonium perfluoro-3,6-dioxa-octanoate.

A liquid material before incorporating a powder containing silicon dioxide may be a slurry fluid containing a solid component (excluding the powder containing silicon dioxide).

The solid component may, for example, be a hydrocarbon compound, a fluorinated compound or an inorganic compound. As the solid component, particles having a relatively large particle size, such as particles of an ion exchange resin, may be incorporated therein.

(Powder Containing Silicon Dioxide)

The present invention is characterized by further incorporating a powder containing silicon dioxide into the liquid material containing fluoride ions. By incorporating the powder containing silicon dioxide into the liquid material, it is possible to achieve an effect of suppressing corrosion by silicon dioxide, and thereby to suppress corrosion of glass.

The powder containing silicon dioxide may, for example, be a silica powder (such as a silica gel), a powder of soda lime glass or a powder of borosilicate glass, and a silica gel is preferred in view of high purity of silicon dioxide and from the viewpoint that the corrosion of glass is sufficiently suppressed.

The content of silicon dioxide in the powder is preferably at least 60 mass %, more preferably at least 90 mass %, further preferably at least 99 mass %, based on 100 mass % of the powder, from the viewpoint that the corrosion of glass is sufficiently suppressed.

The content of silicon dioxide derived from the powder is, in a molar ratio, at least one time, more preferably at least 30 times, furthermore preferably at least 100 times, to the fluoride ions in the liquid material, from the viewpoint that the corrosion of glass is suppressed.

One example for supporting that the content of silicon dioxide derived from the powder is at least one time in a molar ratio, to the fluoride ions in the liquid material, is shown below.

As an embodiment of corrosion of glass, the following formula (1) is taken as one model.

$$SiO_2 + Na_2O + 6HF \rightarrow Na_2SiF_6 + 3H_2O \quad (1)$$

Gibbs free energy of the formula (1) is calculated on the basis of the following formulae (2) and (3).

$$SiO_2 + 4HF \rightarrow SiF_4 + 2H_2O \quad (2)$$

$$Na_2O + 2HF \rightarrow 2NaF + H_2O \quad (3)$$

Gibbs free energy of the formula (2) is −1,615 kJ/mol, Gibbs free energy of the formula (3) is −573 kJ/mol, and therefore the Gibbs free energy of the formula (1) is −2,188 kJ/mol.

Further, in an actual reaction of glass with hydrogen fluoride, a reaction of an alkali component other than a Na component with hydrogen fluoride may also proceed, but this time, only a reaction of a Na component with hydrogen fluoride is considered as one model.

On the other hand, Gibbs free energy of a reaction of hydrogen fluoride with a powder of silicon dioxide (100 mass %) is −1,615 kJ/mol when the formula (2) is taken as one model.

Further, in an actual reaction of a powder with hydrogen fluoride, a reaction of the following formula (4) also proceeds, but this time, only the formula (2) is considered as one model.

$$SiO_2 + 6HF \rightarrow H_2SiF_6 + 2H_2O \quad (4)$$

From the Gibbs free energy, it is found that the corrosion of glass in the formula (1) proceeds more easily than the reaction of the powder with hydrogen fluoride in the formula (2).

In particular, a study is conducted on a case where an aqueous solution (a liquid material) having a hydrogen fluoride concentration of 100 mass ppm and containing a powder of silicon dioxide having an average particle size of 50 μm, is charged into a glass container having a capacity of 2,000 L. The study is based on the assumption that the content of $Na_2O$ present in a system is always constant, that the reaction of hydrogen fluoride with the glass container or the powder of silicon dioxide occurs only on the surface, and that hydrogen fluoride does not act on silicon dioxide of the glass container.

Figure 1:
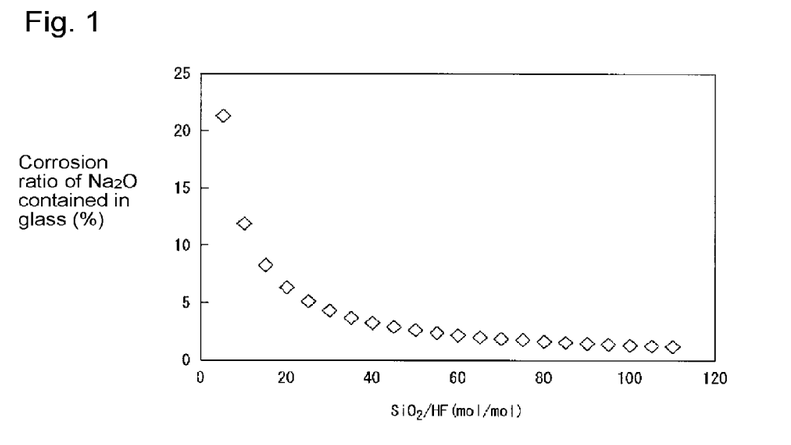
FIG. 1 is a graph illustrating a dependence of a corrosion ratio of $Na_2O$ contained in glass, on the molar ratio ($SiO_2$/HF) of silicon dioxide ($SiO_2$) contained in a powder to hydrogen fluoride (HF) contained in a liquid material.

FIG. 1 illustrates the dependence of the corrosion ratio of $Na_2O$ contained in glass, on the molar ratio ($SiO_2$/HF) of silicon dioxide ($SiO_2$) contained in the powder to hydrogen fluoride (HF) contained in the liquid material, in the above case.

As is apparent from FIG. 1, the corrosion ratio of glass ($Na_2O$) exponentially decreases as the amount of the powder of silicon dioxide increases, when an approximate expression is drawn from experimental values. That is, the corrosion ratio of glass ($Na_2O$) is 100% when the amount of silicon dioxide derived from the powder is 0 time in a molar ratio to the hydrogen fluoride in the liquid material, 50% when one time in a molar ratio, 4.3% when 30 times in a molar ratio, and 1.3% when 100 times in a molar ratio.

Since the same results were obtained in the after-mentioned Examples although such results may depend upon the type of glass, it is suggested that the effect of suppressing corrosion of glass by silicon dioxide can be arranged by the Gibbs free energy of each of the formulae (1) and (2).

The amount of silicon dioxide derived from the powder is preferably at most 200 times, more preferably at most 150 times, further preferably at most 120 times, in a molar ratio, to the fluoride ions in the liquid material. The larger the amount of the powder containing silicon dioxide becomes, the more the corrosion of glass is suppressed, but if the amount of the powder containing silicon dioxide is too large, the liquid material is formed into a slurry fluid, whereby e.g. stirring of the liquid material tends to be difficult. In the above case, it is necessary to add a liquid containing no fluoride ions in such an amount that the powder containing silicon oxide is uniformly dispersed in the liquid material.

An average particle size of the powder containing silicon dioxide is preferably at most 0.5 mm, more preferably at most 5 μm from the viewpoint that the corrosion of glass is sufficiently suppressed.

The following is one example for supporting that the average particle size of the powder containing silicon dioxide is preferably at most 0.5 mm.

The surface area of the powder per 1 mol of silicon dioxide is 1,371 m² on the assumption that the powder of silicon dioxide has an average particle size of 50 μm and an absolute specific gravity of 2.1 g/mL and that the powder of silicon dioxide has a spherical shape. On the other hand, the surface area of the glass container having a capacity of 2,000 L is 7.3 m². When the amount of the powder of silicon dioxide is made to be 100 times in a molar ratio to the fluoride ions in an aqueous solution (liquid material), the surface area ratio (a surface area of powder/a surface area of glass container) of the powder of silicon dioxide to the glass container, becomes 30.0 times of the surface area ratio when it is made to 30 times in a molar ratio. This ratio is substantially agrees with the ratio (=4.3/1.3=30.9) of the above-mentioned corrosion ratio of glass. That is, it is considered that the corrosion of glass can be suppressed by selecting a powder having an average particle size as small as possible and increasing the surface area of the powder.

An average particle size of the powder containing silicon dioxide is preferably at least 1 μm, more preferably at least 3 μm, in view of handling efficiency of the powder.

Further, in a case where it is necessary to separate the powder containing silicon dioxide in a subsequent step, it is necessary to select an average particle size of the powder considering sieves of a filter for collecting the powder.

It is preferred that the powder containing silicon dioxide is uniformly dispersed in a liquid material before the liquid material is in contact with glass. The method for dispersing the powder may be a method of mixing it by a stirrer.

In a case where there is no equipment for dispersing the powder containing silicon dioxide into the liquid material before bringing the liquid material into contact with glass, the powder may be dispersed while the liquid material is brought into contact with the glass. However, if it takes long to disperse the powder, the corrosion of glass tends to proceed, and therefore it is necessary to disperse the powder quickly, immediately after the liquid material is in contact with the glass.

(Mechanism of Action)

According to the above-described method for suppressing corrosion of glass of the present invention, the liquid material containing fluoride ions further contains a powder containing silicon dioxide, whereby the fluoride ions are easily reactive with the powder having a much larger surface area than glass provided on a portion to be in contact with the liquid material in an equipment or an apparatus for treating the liquid material. Therefore, it is possible to achieve an effect of suppressing corrosion by silicon dioxide contained in the powder and thereby to reduce fluoride ions in the liquid material. As a result, it is possible to suppress corrosion of glass to be in contact with a liquid material containing fluoride ions or a condensate of gas vaporized from the liquid material even when the liquid material containing fluoride ions is treated, without adding an alkaline substance, and further without imposing restrictions on e.g. a temperature, a pH, a fluoride ion concentration, a water content and a content of a solid component.

In particular, when the amount of silicon dioxide derived from the powder is at least one time in a molar ratio to the fluoride ions in the liquid, the effect of suppressing corrosion of the glass is sufficiently achieved. When the amount of silicon dioxide derived from the powder is at least 30 times in a molar ratio to the fluoride ions in the liquid, the corrosion rate of glass falls in a complete corrosion resistance range with a life span of glass lining of at least 5 years. According to the method for suppressing corrosion of the present invention, it is possible to treat a liquid material under acidic conditions with hydrochloric acid or a liquid material in a state of slurry fluid, in an equipment or an apparatus having glass provided on a portion to be in contact therewith.

EXAMPLES

Now, the present invention will be described in detail with reference to Examples, but it should be understood that the present invention is by no means restricted thereto.

The fluoride ion concentration, the fluorosurfactant concentration and the average particle size of the powder were measured as follows.
(Fluoride Ion Concentration)
In a case where a medium for a liquid material containing fluoride ions is water:

To a polyethylene-made container, 50 mL of a liquid material was charged, and 1 mL of a phosphate buffer solution (concentration; 0.05 M) was added, followed by heat treatment at 105° C. for 30 minutes under a slightly elevated pressure (about 125 kPaA). After cooling the resultant, 5 mL of a sample was adjusted to a constant volume of 100 mL with pure water, and the fluoride ion concentration was measured by means of a fluoride ion meter.
In a case where a medium for a liquid material containing fluoride ions is a water-insoluble organic solvent:

To a liquid material, pure water in the same amount as the liquid material was added, the resultant was vigorously shaken for about 5 minutes, and then the resultant was left at rest for about 30 minutes, and the resulting aqueous layer was separated. In the aqueous layer thus obtained, the fluoride ion concentration was measured in the same manner as in the case where a medium is an aqueous medium.
(Fluorosurfactant Concentration)

The fluorosurfactant concentration was measured by colorimetric analysis with methylene blue.

To about 500 mL of water, 12 g of sulfuric acid (concentration; at least 98 mass %) was gradually added, followed by cooling, then 0.03 g of methylene blue and 50 g of anhydrous sodium sulfate were dissolved therein, and water was added thereto, to obtain 1 L of a methylene blue reagent.

In a screw vial, 5 ml of the methylene blue reagent and 5 ml of chloroform were put, 0.1 g of a sample was added and vigorously shaken, and the liquid was left at rest for separation. The lower layer chloroform layer was recovered in a cell for measurement of absorbance with a dropper, and the absorbance at a wavelength of 630 nm was measured by a spectrophotometer. The fluorosurfactant concentration was determined from the obtained absorbance with reference to a preliminarily prepared analytical curve from a sample having a known concentration.

(Average Particle Size of Powder)

An average particle size (D50) of a powder was measured by a sieving method, and further with respect to a powder having an average particle size of less than 10 μm, the average particle size was measured again by a Coulter Counter (multisizer 3, manufactured by BECKMAN COULTER) to obtain an applied value.
(Test Liquid 1)

Using as a fluorosurfactant $C_2F_5OC_2F_4OCF_2COONH_4$ (hereinafter referred to as EEA) and $CF_3(CF_2)_6COONH_4$ (hereinafter referred to as APFO), tetrafluoroethylene (hereinafter referred to as TFE) was subjected to emulsion polymerization to obtain an aqueous dispersion of polytetrafluoroethylene (hereinafter referred to as PTFE).

PTFE contained in the aqueous dispersion thus obtained was coagulated, and the PTFE was separated to obtain a coagulate waste liquid 1. In the coagulate waste liquid 1, an uncoagulated solid content (hereinafter referred to as SS content) was contained in an amount of 2,300 mass ppm. The fluorosurfactant concentration in the coagulate waste liquid 1 was 400 mass ppm, and the concentrations of EEA and APFO were respectively 360 mass ppm and 40 mass ppm.

Then, 35 mass % industrial hydrochloric acid was added to the coagulate waste liquid 1 until the pH became 2, and aluminum chloride hexahydrate in an amount of 120 mass ppm to the coagulate waste liquid 1 was added, followed by stirring for 5 minutes to coagulate the SS content in the coagulate waste liquid 1. Then, a 20 mass % sodium hydroxide aqueous solution was added until the pH of the coagulate waste liquid 1 became 10, followed by stirring for 5 minutes. Then, the liquid was left at rest for 1 hour, and the supernatant liquid of the coagulate waste liquid 1 was recovered as a surfactant aqueous solution A. The surfactant aqueous solution A was colorless and transparent, and had a SS content of 40 mass ppm and a fluorosurfactant concentration (the total of EEA and APFO, the same applies hereinafter) of 400 mass ppm.

The fluorosurfactant aqueous solution A was concentrated under reduced pressure by using a heating tube surface evaporating concentrator (VVCC concentrator, tradename, manufactured by Sasakura Engineering Co., Ltd.) equipped with a heat pump. The amount of supply of the surfactant aqueous solution A to the VVCC concentrator was 4,000 L/hr, and the internal pressure of the VVCC concentrator was maintained under 20 kPaA. Further, the temperature of the circulating liquid in the VVCC concentrator was maintained at 55±2° C. 120,000 L of the surfactant aqueous solution A was concentrated 60-fold over a period of 30 hours to obtain 2,000 L of a surfactant aqueous solution B having a fluorosurfactant concentration of 2.4 mass %. Here, the fluorosurfactant concentration was measured by means of colorimetric analysis with methylene blue.

Using a flash concentrator (FTC concentrator, tradename, manufactured by Sasakura Engineering Co., Ltd.) equipped with an ejector, the surfactant aqueous solution B was further concentrated. The concentrator was equipped with an ejector which recovers vapor formed in the evaporator, and utilizes the recovered vapor for superheating the surfactant aqueous solution withdrawn from the evaporator. Further, the surfactant in this concentrator was concentrated by spraying the superheated surfactant aqueous solution B into the evaporator so that it undergoes flash evaporation.

At the initial stage of operation, for the purpose of suppressing foaming of the aqueous solution in the evaporator, operation was started using industrial water. Specifically, industrial water was charged up to 40% of the capacity of the evaporator in the FTC concentrator, the pressure in the evaporator was reduced to 17 kPaA, and the amount of the circulating liquid was adjusted so that the temperature of the industrial water in the evaporator became 55° C. Then, at the time when the pressure in the evaporator became 17 kPaA, the liquid phase temperature became 55° C. and the vapor phase temperature became 65° C., the amount of the industrial water in the evaporator was reduced to 20% of the capacity of the evaporator, and supply of the surfactant aqueous solution B was started. During the concentration operation, the pressure in the evaporator was maintained at 17 kPaA. Further, the liquid phase temperature in the evaporator was maintained at 55° C. Here, the boiling point of water under a pressure of 17 kPaA is 57° C.

The surfactant aqueous solution B withdrawn from the evaporator was superheated, sprayed from the nozzles into the evaporator and subjected to flash evaporation, the formed vapor was removed, and 1,000 L of the surfactant aqueous solution B was concentrated to 250 L over a period of 6 hours to obtain a test liquid 1. By the difference in timing of recovering the test liquid 1, four types of test liquids 1, that is test liquid 1-1, test liquid 1-2, test liquid 1-3 and test liquid 1-4, were obtained. The fluorosurfactant concentration in each of the four types of the test liquids 1 was about 10 mass %, and the fluoride ion concentration was from 77 to 200 mass ppm. It is assumed that the change of the fluoride ion concentration is due to hydrogen fluoride produced by decomposition of EEA which is easily decomposable by a heat load.

(Test Liquid 2)

Using EEA or APFO as a fluorosurfactant, TFE was subjected to emulsion polymerization to produce an aqueous dispersion of PTFE.

PTFE contained in the aqueous dispersion thus obtained was coagulated, the PTFE was then separated, and the PTFE having free water remained therein was dried under hot air atmosphere of from 180 to 220° C. Since the dry gas tends to contain EEA or APFO, the dry gas was made to be absorbed in 48 mass % (at the time of initially charging) potassium carbonate aqueous solution, and a liquid recovered was regarded as a test liquid 2. By the difference in timing of recovering the test liquid 2, three types of test liquids 2, that is test liquid 2-1, test liquid 2-2 and test liquid 2-3 were obtained. The fluoride ion concentration in each of the three types of the test liquids 2 was from 460 to 9,000 mass ppm. It is assumed that the fluoride ion concentration is much higher than the test liquid 1 due to hydrogen fluoride produced by thermal decomposition of PTFE, EEA or APFO during drying.

(Test Liquid 3)

Using EEA or APFO as a fluorosurfactant, TFE was subjected to emulsion polymerization to produce an aqueous dispersion of PTFE.

A nonionic surfactant was added to the aqueous dispersion thus obtained, EEA or APFO was adsorbed and recovered by a strong basic type (I type) ion exchange resin. The resulting slurry was regarded as a test liquid 3. By the difference in timing of recovering the test liquid 3, two types of test liquids 3, that is test liquid 3-1 and test liquid 3-2 were obtained. The fluoride ion concentration in each of the two types of the test liquids was from 2 to 18 mass ppm.

(Recovery and Reuse of Fluorosurfactant)

By the following operation, a fluorosurfactant was recovered from the test liquid 1 or the test liquid 2.

To the test liquid, 35 mass % hydrochloric acid was added until the pH became at most 0.2 so as to convert a fluorosurfactant from a salt form to an acid form, whereby an aqueous solution containing an acidic fluorosurfactant was obtained. To the aqueous solution, HCFC-225ca (3,3-dichloro-1,1,1,2,2-pentafluoropropane), HCFC-225cb (1,3-dichloro-1,1,2,2,3-pentafluoropropane), HFE-347pc-f (1,1,2,2-tetrafluoro-1-(2,2,2-trifluoroethoxy)ethane) or a mixture thereof, as a fluorosolvent, was added in an amount equivalent to or larger than the acidic fluorosurfactant so as to selectively extract the acid form fluorosurfactant into a fluorosolvent layer, and thereafter, two phase separation was carried out to obtain a fluorinated solvent layer, which was then purified by distillation to recover the acid form fluorosurfactant. The resulting acid form fluorosurfactant is formed into an ammonium salt by ammonium water or ammonia gas, whereby it is possible to recycle the fluorosurfactant.

By the following operation, a fluorosurfactant was recovered from the test liquid 3.

To the test liquid 3, 35 mass % hydrochloric acid was added in an amount of one time by mass to the ion exchange resin having the fluorosurfactant adsorbed, then HCFC-225ca, HCFC-225cb, HFE-347pc-f or a mixture thereof in an amount of one time by mass to the ion exchange resin was added, and further acetonitrile in an amount of one time by mass to the ion exchange resin was added, followed by mixing for 5 hours or more thereby to selectively extract an acid form fluorosurfactant into a solvent layer, and thereafter, two phase separation was carried out to obtain the solvent layer, which was then purified by distillation to recover the acid form fluorosurfactant. The resulting acid form fluorosurfactant was formed into an ammonium salt by ammonia water or ammonia gas, whereby it is possible to recycle the fluorosurfactant.

Among the above steps, steps subsequent to purification by distillation allow glass to be less corroded since a solvent layer having fluoride ions removed is treated therein. Therefore, a liquid obtained by acidifying with hydrochloric acid, which is assumed to be most likely to corrode glass, was employed as a test liquid for the following corrosion test. From four type of the test liquids 1, test liquid 11-1, test liquid 11-2, test liquid 11-3 and test liquid 11-4 having a pH of 0.1, respectively, were obtained. From three types of the test liquids 2, test liquid 21-1, test liquid 21-2 and test liquid 21-3 having a pH of 0.1, respectively, were obtained. From two types of the test liquids 3, test liquid 31-1 and test liquid 31-2 having a pH of at most 0, respectively, were obtained.

(Glass Corrosion Test)

A test specimen (a pestle type test specimen #Octa88-200B, manufactured by Hakko Sangyo Co., Ltd.) subjected to the same glass lining as an actual equipment or apparatus (such as a reactor equipped with a stirrer, a distillation column or a multitubular heat exchanger) was prepared.

Into a fluororesin-made container having an internal capacity of 1,000 mL, 500 mL of a test liquid was charged, a prescribed amount of spherical silica gel (M.S.GEL, average particle size: 50 μm, content of silicon dioxide: 99.9 mass %, manufactured by AGC Si-Tech Co., Ltd.) was added thereto, and then the test specimen was set in each of a liquid phase and a gas phase. The test specimen in the gas phase was equipped in such a manner that the pestle type test specimen having a constricted portion wound with a PTFE seal tape was suspended from the upper part of the container. While the internal temperature was kept at 95° C., a corrosion rate (mm/year) was calculated from the change in mass of the glass lining test specimen after expiration of 200 hours. Here, the fluororesin container was sealed, and the test specimen in the gas phase was made to be in contact with a condensate of gas vaporized from the test liquid. Further, the corrosion rate was calculated in accordance with the following:

(1) A mass of a glass lining test specimen before and after the test is measured.
(2) Corrosion degree (unit: mg/dm$^2$/day) is calculated.
(3) A corrosion rate (unit: mm/year) is obtained by multiplying a conversion factor (x0.0365/d) at the end.

The molar ratio (SiO$_2$/F$^-$) (at the time of initial charging) of silicon dioxide (SiO$_2$) contained in spherical silica gel to fluoride ions (F$^-$) contained in the test liquid was made to be 0, 30 or 100.

Figure 2:
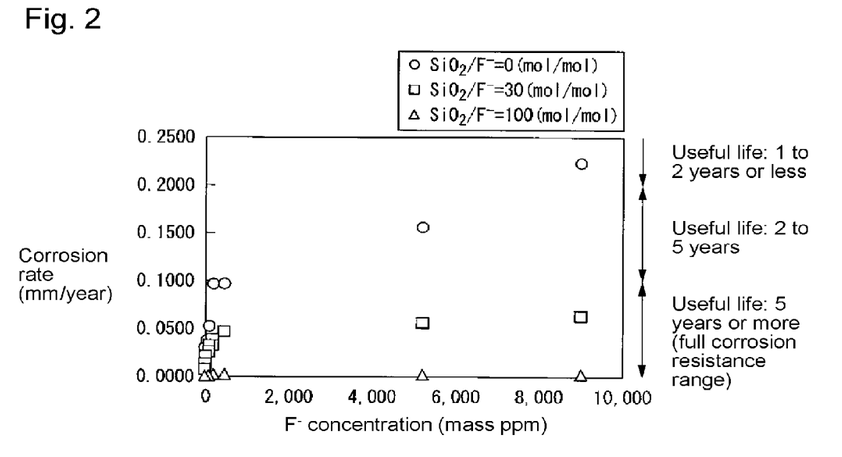
FIG. 2 is a graph illustrating a relation between a concentration of fluoride ions ($F^-$) contained in a liquid material and a corrosion rate of glass to be in contact with a condensate of gas vaporized from the liquid material, in Examples.

The relation between the concentration of the fluoride ions (F$^-$) contained in the test liquid and the corrosion rate of the test specimen to be in contact with a condensate of gas vaporized from the test liquid is shown in FIG. 2 and Table 1.

Figure 3:
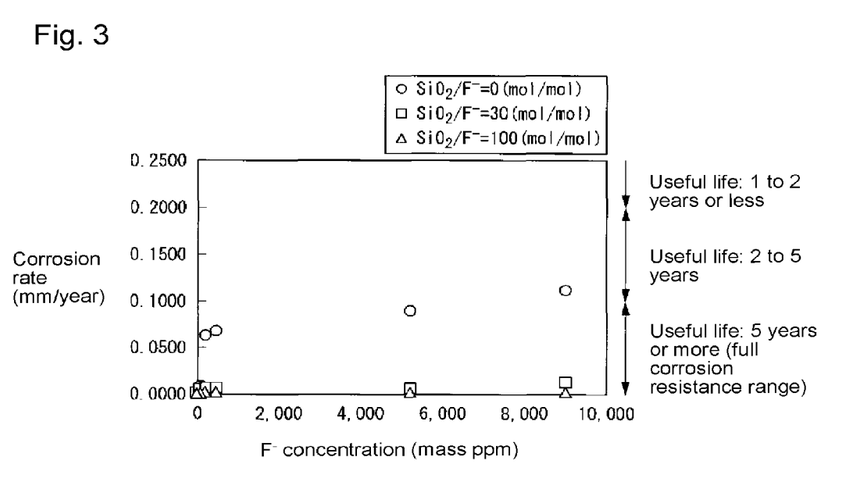
FIG. 3 is a graph illustrating a relation between a concentration of fluoride ions ($F^-$) contained in a liquid material and a corrosion rate of glass to be in contact with the liquid material, in Examples.

The relation between the concentration of the fluoride ions (F$^-$) contained in the test liquid and the corrosion rate of the test specimen to be in contact with the test liquid is shown in FIG. 3 and Table 2.

TABLE 1

|  |  |  | Test liquid | | | | | | | | |
|---|---|---|---|---|---|---|---|---|---|---|---|
|  |  |  | 31-1 | 31-2 | 11-1 | 11-2 | 11-3 | 11-4 | 21-1 | 21-2 | 21-3 |
|  | Fluoride ion concentration | Mass ppm | 2 | 18 | 77 | 98 | 198 | 200 | 460 | 5230 | 9000 |
|  | Temperature | ° C. | 95 | 95 | 95 | 95 | 95 | 95 | 95 | 95 | 95 |
| Corrosion rate | SiO$_2$/F$^-$ = 0 | mm/year | 0.0137 | 0.0299 | 0.0372 | 0.0523 | 0.0976 | 0.0958 | 0.0973 | 0.156 | 0.2231 |
|  | SiO$_2$/F$^-$ = 30 | mm/year | 0.0087 | 0.0212 | 0.0256 | 0.0323 | 0.0376 | 0.0333 | 0.0477 | 0.056 | 0.0622 |
|  | SiO$_2$/F$^-$ = 100 | mm/year | 0.0007 | 0.0011 | 0.0012 | 0.0013 | 0.0012 | 0.0011 | 0.0022 | 0.0015 | 0.0022 |

TABLE 2

|  |  |  | Test liquid | | | | | | | | |
|---|---|---|---|---|---|---|---|---|---|---|---|
|  |  |  | 31-1 | 31-2 | 11-1 | 11-2 | 11-3 | 11-4 | 21-1 | 21-2 | 21-3 |
|  | Fluoride ion concentration | Mass ppm | 2 | 18 | 77 | 98 | 198 | 200 | 460 | 5230 | 9000 |
|  | Temperature | ° C. | 95 | 95 | 95 | 95 | 95 | 95 | 95 | 95 | 95 |
| Corrosion rate | SiO$_2$/F$^-$ = 0 | mm/year | 0.0001 | 0.0025 | 0.0052 | 0.0077 | 0.0623 | 0.0647 | 0.0682 | 0.0899 | 0.1112 |
|  | SiO$_2$/F$^-$ = 30 | mm/year | 0.0000 | 0.0003 | 0.0025 | 0.0027 | 0.0033 | 0.0047 | 0.0055 | 0.0057 | 0.0120 |
|  | SiO$_2$/F$^-$ = 100 | mm/year | 0.0000 | 0.0000 | 0.0004 | 0.0007 | 0.0004 | 0.0012 | 0.0003 | 0.0006 | 0.0006 |

According to the evaluation standard of Hakko Sangyo Co., Ltd., a useful life of 5 years or more, that is a full corrosion resistance, is achieved when the corrosion rate is at most 0.1 mm/year. The useful life is from 2 to 5 years when the corrosion rate is from 0.1 to 0.2 mm/year. The useful life is at most 1 to 2 years when the corrosion rate is at least 0.2 mm/year.

On the basis of the above standard, it is found that the glass to be in contact with each of a liquid material and a condensate falls in a range of the full corrosion resistance when the amount of silicon dioxide derived from a powder is 30 times in a molar ratio to fluoride ions in the liquid material.

Further, when the amount of silicon dioxide derived from a powder is in a molar ratio of 100 times to the fluoride ions in the liquid material, it is found that the corrosion rate further decreases, and no substantial corrosion of glass proceeds.

INDUSTRIAL APPLICABILITY

The method of suppressing corrosion of glass of the present invention is useful as a method for suppressing corrosion of glass to be in contact with either one or both of a liquid material containing fluoride ions and a condensate of gas vaporized from the liquid material, in an equipment or an apparatus handling the liquid material containing fluoride ions, and is preferably applicable in industrial fields such as production of a fluorinated compound.

This application is a continuation of PCT Application No. PCT/JP2015/051909 filed on Jan. 23, 2015, which is based upon and claims the benefit of priority from Japanese Patent Application No. 2014-012759 filed on Jan. 27, 2014. The contents of those applications are incorporated herein by reference in their entireties.

What is claimed is:

1. A method for suppressing corrosion of glass to be in contact with either one or both of a liquid material comprising fluoride ions and a condensate of gas vaporized from the liquid material, the method comprising:
    adding a powder comprising silicon dioxide to a liquid material comprising fluoride ions; and
    contacting the glass with the liquid material comprising the silicon dioxide or the condensate of gas vaporized from the liquid material comprising the silicon dioxide, wherein
    the silicon dioxide is contained in a molar ratio of one or more times to the fluoride ions, and
    the liquid material comprises hydrochloric acid, sulfuric acid, nitric acid, phosphoric acid or boric acid, and has a pH of less than 7.

2. The method for suppressing corrosion of glass according to claim 1, wherein the glass is provided on a portion, in an equipment or an apparatus for treating the liquid material, to be in contact with either one or both of the liquid material and the condensate.

3. The method for suppressing corrosion of glass according to claim 1, wherein the silicon dioxide is contained in an amount of at least 60 mass % based on 100 mass % of the powder.

4. The method for suppressing corrosion of glass according to claim 1, wherein the powder has an average particle size of at most 0.5 mm.

5. The method for suppressing corrosion of glass according to claim 1, wherein the concentration of the fluoride ions is at least 0.1 mass ppm.

6. The method for suppressing corrosion of glass according to claim 1, wherein the liquid material comprises hydrochloric acid, and has a pH of less than 7.

7. The method for suppressing corrosion of glass according to claim 1, wherein the liquid material comprises a fluorosurfactant.

8. The method for suppressing corrosion of glass according to claim 7, wherein the fluorosurfactant is either one or both of ammonium perfluorooctanoate and ammonium perfluoro-3,6-dioxa-octanoate.

9. The method for suppressing corrosion of glass according to claim 1, wherein the powder comprising silicon dioxide is a silica gel.

10. The method for suppressing corrosion of glass according to claims 1, wherein the silicon dioxide is contained in a molar ratio of at most 120 times to the fluoride ions.

11. The method for suppressing corrosion of glass according to claim 1, wherein the liquid material comprises sulfuric acid.

12. The method for suppressing corrosion of glass according to claim 1, wherein the liquid material comprises nitric acid.

13. The method for suppressing corrosion of glass according to claim 1, wherein the liquid material comprises phosphoric acid.

14. The method for suppressing corrosion of glass according to claim 1, wherein the liquid material comprises boric acid.

* * * * *